US012451153B2

(12) United States Patent
Mosayyebpour Kaskari et al.

(10) Patent No.: US 12,451,153 B2
(45) Date of Patent: Oct. 21, 2025

(54) SEMI-ADAPTIVE BEAMFORMER

(71) Applicant: Synaptics Incorporated, San Jose, CA (US)

(72) Inventors: Saeed Mosayyebpour Kaskari, Irvine, CA (US); Alireza Masnadi-Shirazi, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 325 days.

(21) Appl. No.: 18/051,742

(22) Filed: Nov. 1, 2022

(65) Prior Publication Data

US 2024/0153521 A1 May 9, 2024

(51) Int. Cl.
*G10L 21/0272* (2013.01)
*G10L 21/0232* (2013.01)
*G10L 25/84* (2013.01)
*G10L 21/0216* (2013.01)

(52) U.S. Cl.
CPC ...... *G10L 21/0272* (2013.01); *G10L 21/0232* (2013.01); *G10L 25/84* (2013.01); *G10L 2021/02166* (2013.01)

(58) Field of Classification Search
CPC ...................... G10L 2021/02166; H04R 3/005
See application file for complete search history.

(56) References Cited

U.S. PATENT DOCUMENTS

2016/0192068 A1* 6/2016 Ng ......................... H04R 1/406 381/92
2019/0088269 A1* 3/2019 Markovich Golan ....................... G10L 21/0364
2019/0172450 A1* 6/2019 Mustiere ............. G10L 21/0232

OTHER PUBLICATIONS

Tanaka, et al., "Acoustic Beamforming with Maximum SNR Criterion and Efficient Generalized Eigenvector Tracking," Springer, 2014. (Year: 2014).*

* cited by examiner

*Primary Examiner* — Feng-Tzer Tzeng
(74) *Attorney, Agent, or Firm* — Paradice & Li LLP

(57) ABSTRACT

This disclosure provides methods, devices, and systems for beamforming. The present implementations more specifically relate to semi-adaptive beamforming techniques. In some aspects, a semi-adaptive beamformer may determine an RTF vector based on an audio signal received via a microphone array (also referred to as an "instantaneous" RTF vector) and may further determine an MVDR beamforming filter for the microphone array based on a combination of the instantaneous RTF vector and a "fixed" RTF vector. The fixed RTF vector may include a set of RTFs that are known to produce a relatively accurate MVDR beamforming filter for any users of the microphone array. In some implementations, the semi-adaptive beamformer may determine the MVDR beamforming filter based on a weighted average of the instantaneous RTF vector and the fixed RTF vector, where the weighting can be dynamically adjusted based on the quality of the received audio signal or various other conditions.

20 Claims, 5 Drawing Sheets

SEMI-ADAPTIVE BEAMFORMER

TECHNICAL FIELD

The present implementations relate generally to signal processing, and specifically to a semi-adaptive beamformer for signal processing.

BACKGROUND OF RELATED ART

Beamforming is a signal processing technique that can focus the energy of signals transmitted or received in a spatial direction. For example, a beamformer can improve the quality of speech detected by a microphone array through signal combining at the microphone outputs. More specifically, the beamformer may apply a respective weight to the audio signal output by each microphone of the microphone array so that the signal strength is enhanced in the direction of the speech (or suppressed in the direction of noise) when the audio signals are combined. Adaptive beamformers are capable of dynamically adjusting the weights of the microphone outputs to optimize the quality, or the signal-to-noise ratio (SNR), of the combined audio signal. As such, an adaptive beamformer can adapt to changes to the environment. Example adaptive beamforming techniques include minimum mean square error (MMSE) beamforming, minimum variance distortionless response (MVDR) beamforming and generalized eigenvalue (GEV) beamforming, among other examples.

Adaptive beamformers need time to converge on an optimal set of weights. Prior to convergence, an adaptive beamformer may distort or even suppress audio signals in the direction of incoming speech. Further, in low-SNR environments, an adaptive beamformer may converge in a direction other than the direction of speech (such as a direction of a dominant noise source). Thus, there is a need to reduce the delay required for an adaptive beamformer to converge while also preventing the beamformer from converging in the wrong direction.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of processing audio signals. The method includes receiving an audio signal via a plurality of microphones, where the audio signal includes a plurality of frames each having a respective speech component and a respective noise component; determining a plurality of first relative transfer functions (RTFs) associated with the plurality of microphones, respectively, based on a first frame of the plurality of frames; and determining a first minimum variance distortionless response (MVDR) beamforming filter that reduces a power of the noise component, without distorting the speech component, of the first frame based at least in part on the plurality of first RTFs, a plurality of fixed RTFs associated with the plurality of microphones, and a covariance of the noise component of the first frame.

Another innovative aspect of the subject matter of this disclosure can be implemented in a beamformer, including a processing system and a memory. The memory stores instructions that, when executed by the processing system, cause the beamformer to receive an audio signal via a plurality of microphones, where the audio signal includes a plurality of frames each having a respective speech component and a respective noise component; determine a plurality of first RTFs associated with the plurality of microphones, respectively, based on a first frame of the plurality of frames; and determine a first MVDR beamforming filter that reduces a power of the noise component, without distorting the speech component, of the first frame based at least in part on the plurality of first RTFs, a plurality of fixed RTFs associated with the plurality of microphones, and a covariance of the noise component of the first frame.

Another innovative aspect of the subject matter of this disclosure can be implemented in a headset, including a plurality of microphones and a beamformer. The beamformer is configured to receive an audio signal via a plurality of microphones, where the audio signal includes a plurality of frames each having a respective speech component and a respective noise component; determine a plurality of RTFs associated with the plurality of microphones, respectively, based on a first frame of the plurality of frames; and determine an MVDR beamforming filter that reduces a power of the noise component, without distorting the speech component, of the first frame based at least in part on the plurality of RTFs, a plurality of fixed RTFs associated with the plurality of microphones, and a covariance of the noise component of the first frame.

BRIEF DESCRIPTION OF THE DRAWINGS

The present implementations are illustrated by way of example and are not intended to be limited by the figures of the accompanying drawings.

DETAILED DESCRIPTION

Figure 1:
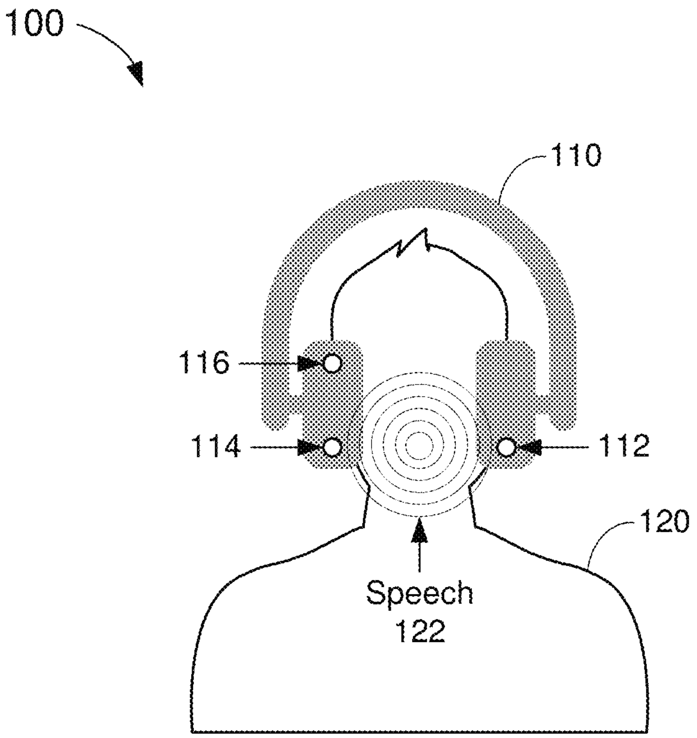
FIG. 1 shows an example environment for which beamforming may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a beamformer can improve the quality of speech detected by a microphone array through signal combining at the microphone outputs. For example, the beamformer may apply a respective weight to the audio signal output by each microphone of the microphone array so that the signal strength is enhanced in the direction of the speech (or suppressed in the direction of noise) when the audio signals are combined. Adaptive beamformers are capable of dynamically adjusting the weights of the microphone outputs to optimize the quality, or the signal-to-noise ratio (SNR), of the combined audio signal. Example adaptive beamforming techniques include minimum mean square error (MMSE) beamforming, minimum variance distortionless response (MVDR) beamforming, and generalized eigenvalue (GEV) beamforming, among other examples.

An MVDR beamformer determines a set of weights (also referred to as an MVDR beamforming filter) that reduces or minimizes the noise component of received audio signals without distorting the speech component. More specifically, the MVDR beamforming filter coefficients can be determined as a function of the covariance of the noise component of the received audio signal and a set of relative transfer functions (RTFs) between the microphones of the microphone array (also referred to as an "RTF vector"). By contrast, a GEV beamformer determines a set of weights (also referred to as a GEV beamforming filter) that maximizes the SNR of the received audio signal. Through generalized eigenvalue decomposition, GEV beamforming can also determine an RTF vector associated with the microphone array.

Adaptive beamformers need time to converge on an optimal set of weights. Prior to convergence, an adaptive beamformer may distort or even suppress audio signals in the direction of incoming speech. Further, in low-SNR environments, an adaptive beamformer may converge in a direction other than the direction of speech (such as a direction of a dominant noise source). Aspects of the present disclosure recognize that, in some environments, the positioning of the microphone array may be relatively fixed in relation to a target audio source. For example, headset-mounted microphones may detect speech from substantially the same direction when the headset is worn by any user (or "speaker"). As a result, the RTF vector associated with a headset-mounted microphone array may exhibit very little (if any) variation in response to audio signals received from different users.

Various aspects relate generally to beamforming, and more particularly, to semi-adaptive beamforming techniques. In some aspects, a semi-adaptive beamformer may determine an RTF vector based on an audio signal received via a microphone array (also referred to as an "instantaneous" RTF vector) and may further determine an MVDR beamforming filter for the microphone array based on a combination of the instantaneous RTF vector and a "fixed" RTF vector. The fixed RTF vector may include a set of RTFs that are known (or "trained") to produce a relatively accurate MVDR beamforming filter for any users of the microphone array. In some implementations, the semi-adaptive beamformer may determine the MVDR beamforming filter coefficients based on a weighted average of the instantaneous RTF vector and the fixed RTF vector, where the weighting can be dynamically adjusted based on the quality of the received audio signal or various other conditions. For example, the weighting may emphasize the instantaneous RTF vector when the SNR of the received audio signal is relatively high and may emphasize the fixed RTF vector when the SNR of the received audio signal is relatively low.

Particular implementations of the subject matter described in this disclosure can be implemented to realize one or more of the following potential advantages. The semi-adaptive beamformer of the present implementations can quickly converge on an optimal set of weights while being restricted from converging in a wrong direction. For example, by training a fixed RTF vector that can be applied to audio signals received from a variety of users, aspects of the present disclosure can determine a relatively accurate starting point with which to initiate an adaptive beamforming procedure. By combining the fixed RTF vector with an instantaneous RTF vector, aspects of the present disclosure may further allow the beamforming procedure to adapt to a particular user in a controlled manner. For example, by emphasizing the instantaneous RTF vector when the SNR is high, the semi-adaptive beamformer can determine an MVDR beamforming filter that more accurately tracks the direction of desired speech. On the other hand, by emphasizing the fixed RTF vector when the SNR is low, the semi-adaptive beamformer is prevented from converging in a direction of a dominant noise source.

FIG. 1 shows an example environment 100 for which beamforming may be implemented. The example environment 100 includes a headset 110 and a user 120. In some aspects, the headset 110 may include a number of microphones 112-116 (also referred to as a "microphone array"). In the example of FIG. 1, the headset 110 is shown to include three microphones 112-116. However, in some other implementations, the headset 110 may include fewer or more microphones than those depicted in FIG. 1.

The microphones 112-116 are positioned or otherwise configured to detect speech 122 (depicted as a series of acoustic waves) propagating from the mouth of the user 120. For example, each of the microphones 112-116 may convert the detected speech 122 to an electrical signal (also referred to as an "audio signal") representative of the acoustic waveform. Each audio signal may include a speech component (representing the user speech 122) and a noise component (representing noise from the headset 110 or the surrounding environment). Due to the spatial positioning of the microphones 112-116, the speech 122 detected by some of the microphones in the microphone array may be delayed relative to the speech 122 detected by some other microphones in the microphone array. In other words, the microphones 112-116 may produce audio signals with varying phase offsets.

In some aspects, the audio signals produced by each of the microphones 112-116 may be weighted and combined to enhance the speech component or suppress the noise component. More specifically, the weights applied to the audio signals may be configured to improve the signal strength in a direction of the speech 122. Such signal processing techniques are referred to as "beamforming." In some implementations, an adaptive beamformer may estimate (or predict) a set of weights to be applied to the audio signals (also referred to as a "beamforming filter") that enhances the signal strength in the direction of speech. The quality of speech in the resulting signal depends on the accuracy of the beamforming filter coefficients. For example, the speech may be enhanced when the beamforming filter is aligned with a direction of the user's mouth. On the other hand, the speech may be distorted or suppressed if the beamforming filter is aligned with a direction of a noise source.

Adaptive beamformers can dynamically adjust the beamforming filter coefficients to optimize the quality, or the signal-to-noise ratio (SNR), of the combined audio signal. Example adaptive beamforming techniques include, among other examples, minimum variance distortionless response (MVDR) beamforming and generalized eigenvalue (GEV) beamforming. An MVDR beamformer determines a beamforming filter that reduces or minimizes the noise component of the audio signals without distorting the speech component. MVDR beamforming assumes that delay-only propagation paths are present between the microphones 112-116 and the sources of audio. However, in a headset-mounted microphone array, the audio signals produced by the microphones 112-116 may include acoustic background noise from a reverberant enclosure or housing of the headset 110. Such reverberation can lead to significant speech cancellation by the MVDR beamformer.

By contrast, a GEV beamformer determines a beamforming filter that maximizes the signal-to-noise ratio (SNR) of the audio signals. More specifically, GEV beamforming adaptively extracts the principal eigenvector incorporating the cross power spectral density matrices of the speech-plus-noise component and the noise-only component of the audio signals produced by the microphones 112-116. This adaptive algorithm does not require any knowledge of the positions of the microphones 112-116 or the sources of audio. However, the algorithm needs time to converge on an optimal set of filter coefficients. Prior to convergence, the GEV beamforming filter may distort or even suppress audio signals in the direction of incoming speech. Further, in low-SNR environments, the GEV beamformer may converge in a direction other than the direction of speech (such as a direction of a dominant noise source).

In some aspects, the headset 110 may include a semi-adaptive beamformer (not shown for simplicity) that can quickly converge on an optimal beamforming filter while being restricted from converging in a wrong direction. In some implementations, the semi-adaptive beamformer may leverage known properties of the headset 110 to determine a beamforming filter that is relatively accurate for a variety of users. For example, as shown in FIG. 1, the headset 110 is designed to be worn on a user's head. More specially, the headset 110 includes a pair of ear cups that are designed to cover the ears of the user 120, and the microphones 112-116 are disposed on the ear cups of the headset 110. Aspects of the present disclosure recognize that the distance between the ears and the mouth is substantially the same for most intended users of the headset 110. Accordingly, the semi-adaptive beamformer may determine the beamforming filter based, at least in part, on prior knowledge of the relative positions of the microphones 112-116 and the mouth of the user 120.

Figure 2:
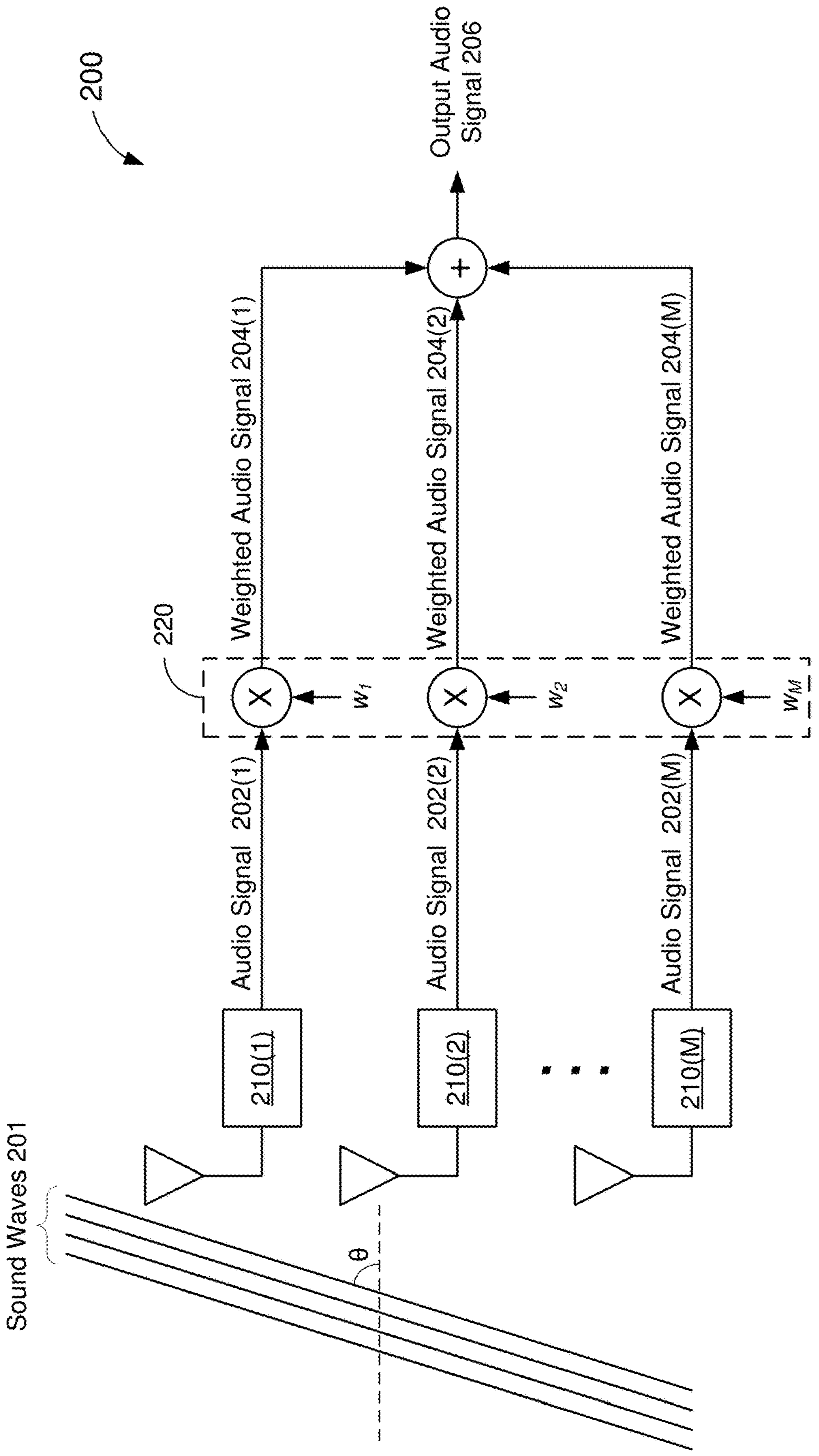
FIG. 2 shows an example audio receiver configurable for beamforming, according to some implementations.

FIG. 2 shows an example audio receiver 200 configurable for beamforming, according to some implementations. The audio receiver 200 includes a number (M) of microphones 210(1)-210(M), arranged in a microphone array, and a beamforming filter 220. In some implementations, the audio receiver 200 may be one example of the headset 110 of FIG. 1. With reference for example to FIG. 1, each of the microphones 210(1)-210(M) may be one example of any of the microphones 112-116.

The microphones 210(1)-210(M) are configured to convert a series of sound waves 201 (also referred to as "acoustic waves") into audio signals 202(1)-202(M), respectively. As shown in FIG. 2, the sound waves 201 are incident upon the microphones 210(1)-210(M) at an angle (θ). In some implementations, the sound waves 201 may include user speech (such as the speech 122 of FIG. 1) mixed with noise or interference (such as reverberant noise from a headset enclosure). Thus, each of the audio signals 202(1)-202(M) may include a speech component (s) and a noise component (u). Due to the spatial positioning of the microphones 210(1)-210(M), each of the audio signals 202(1)-202(M) may represent a delayed version of the same audio signal. For example, using the first audio signal 202(1) as a reference audio signal, each of the remaining audio signals 202(2)-202(M) can be described as a phase-delayed version of the first audio signal 202(1). Accordingly, the audio signals 202(1)-202(M) can be modeled as a vector (y):

$$y(l,k)=a(\theta,k)s(l,k)+u(l,k) \tag{1}$$

where l is a frame index representing one of a number (L) of audio frames, k is a frequency index representing one of a number (K) of frequency bins, and a(θ, k) is a steering vector which represents the set of phase-delays for a sound wave 201 incident upon the microphones 210(1)-210(M).

The beamforming filter 220 applies a vector of weights $w=[w_1, \ldots, w_M]^T$ (where $w_1$-$w_M$ are referred to as filter coefficients) to the audio signals 202(1)-202(M) to produce weighted audio signals 204(1)-204(M), respectively. The weighted audio signals 204(1)-204(M) are further combined (such as by summation) to produce an output audio signal 206. Accordingly, the output audio signal 206 can be modeled as a vector (ŝ):

$$\hat{s}=w^H(k)y(l,k)=w^H(k)a(\theta,k)s(l,k)+w^H(k)u(l,k) \tag{2}$$

where w represents the beamforming filter (or vector) 220. In some aspects, a beamformer (not shown for simplicity) may determine a vector of weights w that optimizes the output audio signal 206 with respect to one or more conditions.

For example, an MVDR beamformer is configured to determine a vector of weights w that reduces or minimizes the variance of the noise component of the output audio signal 206 without distorting the speech component of the output audio signal 206. In other words, the vector of weights w may satisfy the following condition:

$$\arg\min_w w^H(k)R_u(k)w(k) \text{ s. t. } w^H(k)a(\theta l,k)=1$$

where $R_u(k)$ is the covariance of the noise component u(l,k) of the received audio signal y(l,k). The resulting vector of weights w is an MVDR beamforming filter ($w_{MVDR}(k)$), which can be expressed as:

$$w_{MVDR}(k)=\frac{R_u^{-1}(k)a(\theta,k)}{a^H(\theta,k)R_u^{-1}(k)a(\theta,k)} \tag{3}$$

On the other hand, a GEV beamformer (also referred to as a "maximum SNR beamformer") is configured to determine a vector of weights w that increases or maximizes the SNR of the output audio signal 206. For example, the SNR can be expressed as a function of the covariance of the noise component $R_u(k)$ and the covariance of the speech component ($R_s(k)$) of the received audio signal y(l,k):

$$SNR(k)=\frac{w^H(k)R_s(k)w(k)}{w^H(k)R_u(k)w(k)}=\frac{w^H(k)R_y(k)w(k)}{w^H(k)R_u(k)w(k)}-1$$

where $R_y(k)$ is the covariance of the received audio signal y(l,k). The resulting vector of weights w is a GEV beamforming filter ($w_{GEV}(k)$) equal to the principal eigenvector ($v_{max}(k)$) of $R_u^{-1}(k)R_y(k)$.

Through generalized eigenvalue decomposition, the GEV beamformer can determine a relative transfer function (RTF) between each of the microphones 210(1)-210(M) and a reference microphone within the microphone array (such as the first microphone 210(1)). For example, the RTFs can be modeled as an RTF vector (h(k)):

$$h(k)=\frac{R_u(k)v_{max}(k)}{(R_u(k)v_{max}(k))_1}=\frac{R_y(k)v_{max}(k)}{(R_y(k)v_{max}(k))_1}=\frac{R_y(k)w_{GEV}(k)}{(R_y(k)w_{GEV}(k))_1} \tag{4}$$

where $(R_y(k)w_{GEV}(k))_1$ is the first element of $R_y(k)w_{GEV}(k)$.

As described above, GEV beamformers can adaptively determine the vector of weights w based on the received audio signal y(l,k). However, GEV beamformers need time to converge on an optimal vector of weights w, and may even converge in a wrong direction if the SNR of the audio signal y(l,k) is very low. By contrast, MVDR beamformers generally rely on geometry (such as the steering vector a(θ,k)) to determine the vector of weights w. Although MVDR beamformers do not need time to converge, the accuracy of the MVDR beamforming filter $w_{MVDR}(k)$ depends on the accuracy of the steering vector a(θ,k) estimation, which may be difficult to adapt to different users. Aspects of the present disclosure recognize that the steering vector a(θ,k) can also be defined as the RTF vector h(k). Thus, substituting a(θ,k) for h(k) in Equation 3 yields:

$$W_{MVDR}(k)=\frac{R_u^{-1}(k)h(k)}{h^H(k)R_u^{-1}(k)h(k)} \tag{5}$$

In some aspects, a semi-adaptive beamformer may determine the vector of weights w for the beamforming filter 220 based, at least in part, on a fixed RTF vector h*(k). In some implementations, the fixed RTF vector h*(k) may be learned based on audio signals 202(1)-202(M) received via the microphones 210(1)-210(M) as part of a training operation. Thus, such audio signals also may be referred to as "training signals." For example, the training signals may represent speech detected by the microphones 210(1)-210(M) from one or more known users. In some implementations, the fixed RTF vector h*(k) may be determined using GEV beamforming (such as in accordance with Equation 4). For example, a GEV beamformer may determine one or more RTF vectors h(k) based on each of the received training signals and may determine the fixed RTF vector h*(k) as an average of the RTF vectors h(k). As a result, the fixed RTF vector $h^*(k)$ may be generally tailored to suit a variety of users of the audio receiver 200.

However, the fixed RTF vector $h^*(k)$ may not be optimized for any particular user of the audio receiver 200. With reference for example to FIG. 1, each user 120 of the headset 100 may have a unique head shape and head size, resulting in different optimal RTF vectors for different users. In some aspects, the semi-adaptive beamformer may fine-tune the RTF vector used to determine the filter weights $w_1$-$w_M$, for example, to adapt the beamforming filter 220 to the actual user of the audio receiver 200. In some implementations, the semi-adaptive beamformer may determine an instantaneous RTF vector $\hat{h}(k)$ based on the audio signals 202(1)-202(M) received from the current user of the audio receiver 200 and may further determine the filter weights $w_1$-$w_M$ based on a combination of the fixed RTF vector $h^*(k)$ and the instantaneous RTF vector $\hat{h}(k)$. For example, the semi-adaptive beamformer may determine the filter weights $w_1$-$w_M$ based on Equation 5, where $h(k)$ is a combination of $h^*(k)$ and $\hat{h}(k)$.

Figure 3:
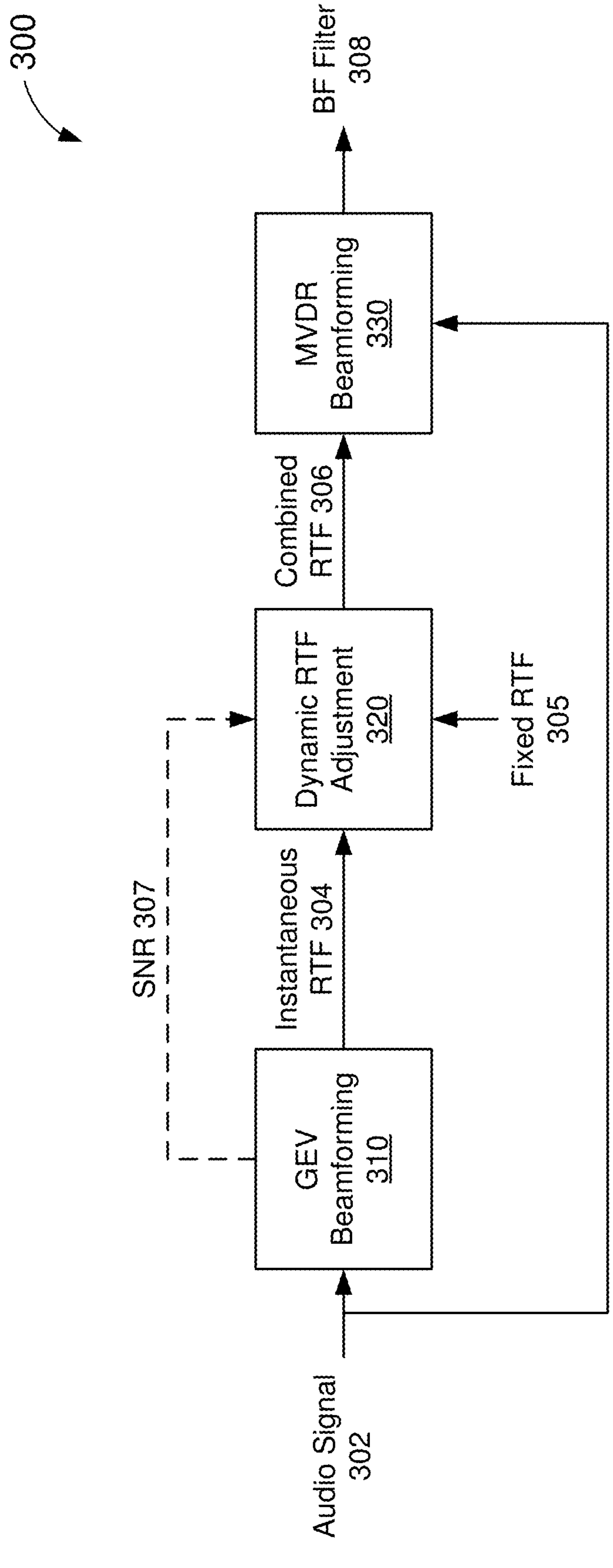
FIG. 3 shows a block diagram of an example semi-adaptive beamformer, according to some implementations.

FIG. 3 shows a block diagram of an example semi-adaptive beamformer 300, according to some implementations. The semi-adaptive beamformer 300 is configured to determine a beamforming (BF) filter 308 based on an audio signal 302 received via a microphone array. In some implementations, the microphone array may include any of the microphones 112-116 of FIG. 1 or any of the microphones 210(1)-210(M) of FIG. 2. With reference for example to FIG. 2, the audio signal 302 may be one example of the audio signal $y(l,k)$ received via the microphones 210(1)-210(M) (which includes the audio signals 202(1)-202(M), respectively) and the beamforming filter 308 may be one example of the beamforming filter 220.

The semi-adaptive beamformer 300 includes a GEV beamforming component 310, a dynamic RTF adjustment component 320, and an MVDR beamforming component 330. The GEV beamforming component 310 is configured to produce a respective instantaneous RTF vector 304 based on each frame of the received audio signal 302. For example, the GEV beamforming component 310 may determine a GEV beamforming filter $w_{GEV}$ (the frequency index k is omitted hereinafter for simplicity) that maximizes the SNR of the audio signal 302 (such as described with reference to FIG. 2). The GEV beamforming component 310 may further determine the instantaneous RTF vector 304 as a function of the GEV beamforming filter $w_{GEV}$ and the covariance ($R_y$) of the audio signal 302 (such as according to Equation 4).

The dynamic RTF adjustment component 320 is configured to produce a combined RTF vector 306 based on the instantaneous RTF vector 304 and a fixed RTF vector 305. For example, the fixed RTF vector 305 may include a set of RTFs determined to be a reasonable fit for a variety of users of the microphone array (such as part of a training procedure). In some implementations, the semi-adaptive beamformer 300 may learn the fixed RTF vector 305 based on audio signals (or training signals) previously received via the microphone array (such as a described with reference to FIG. 2). In some aspects, the dynamic RTF adjustment component 320 may determine the combined RTF vector 306 ($h_l$), for the $l^{th}$ frame of the audio signal 302, as a weighted average of the instantaneous RTF vector 304 ($\hat{h}_l$) for the $l^{th}$ frame and the fixed RTF vector 305 ($h^*$):

$$h_l=\mu_l h^*+(1-\mu_l)\hat{h}_l \tag{6}$$

where $\mu_l$ is a correlation factor associated with the $l^{th}$ frame of the audio signal 302.

In some implementations, the dynamic RTF adjustment component 320 may dynamically adjust the correlation factor $\mu_l$ to emphasize either the instantaneous RTF vector $\hat{h}_l$ or the fixed RTF vector $h^*$. For example, a higher correlation factor $\mu_l$ (such as $\mu_l>0.5$) may emphasize the fixed RTF vector $h^*$ over the instantaneous RTF vector $\hat{h}_l$, whereas a lower correlation factor $\mu_l$ (such as $\mu_l<0.5$) may emphasize the instantaneous RTF vector $\hat{h}_l$ over the fixed RTF vector $h^*$. In some aspects, the dynamic RTF adjustment component 320 may select the correlation factor $\mu_l$ based, at least in part, on an amount of movement of one or more microphones in the microphone array (relative to the position of the user's mouth) compared to a "default" position of the microphones associated with the fixed RTF vector $h^*$. For example, the correlation factor $\mu_l$ can be expressed as:

$$\mu_l=\sum_{f=0}^{F-1}\frac{h^*\hat{h}_l^H}{F\cdot|h^*|\cdot|\hat{h}_l|},\quad 0\le\mu_l\le 1 \tag{7}$$

where F≤K is the number of frequency bins that have been used for averaging in Equation 7. As shown in Equation 7, the correlation factor $\mu_l$ is higher (closer to 1) when the fixed RTF vector $h^*$ is highly correlated with the instantaneous RTF vector $\hat{h}_l$ (for most frequency bins in the range $0\le f\le F-1$).

In some other aspects, the dynamic RTF adjustment component 320 may dynamically adjust the correlation factor $\mu_l$ based, at least in part, on the SNR of the audio signal 302. As described with reference to FIG. 2, the GEV beamforming component 310 determines an SNR 307 associated with the audio signal 302 as part of the procedure for determining the GEV beamforming filter $w_{GEV}$. Accordingly, the dynamic RTF adjustment component 320 may receive the SNR 307 from the GEV beamforming component 310. In some implementations, the dynamic RTF adjustment component 320 may select a lower correlation factor $\mu_l$ when the SNR 307 is relatively high (such as to allow greater adaptation to the current user of the microphone array). In some other implementations, the dynamic RTF adjustment component 320 may select a higher correlation factor $\mu_l$ when the SNR 307 is relatively low (such as to prevent the combined RTF vector 306 from converging in a wrong direction).

The MVDR beamforming component 330 is configured to produce the beamforming filter 308 based on the received audio signal 302 and the combined RTF vector 306. More specifically, the MVDR beamforming component 330 may determine an MVDR beamforming filter $w_{MVDR}$ that reduces or minimizes the power of the noise component, without distorting the speech component, of the $l^{th}$ frame of the received audio signal 302 (such as described with reference to FIG. 2). More specifically, the MVDR beamforming filter ($w_{MVDR,l}$) associated with the $l^{th}$ frame of the received audio signal 302 can be determined by substituting $h_l$ (from Equation 6) for h in Equation 4:

$$w_{MVDR,l}=\frac{R_{u,l}^{-1}h_l}{h_l^H R_{u,l}^{-1}h_l} \tag{8}$$

where $R_{u,l}$ is the covariance of the noise component of the $l^{th}$ frame of the received audio signal 302. The resulting MVDR beamforming filter $w_{MVDR,l}$ includes a vector of weights w that can be used to weight the audio signals received via each microphone of the microphone array (such as the audio signals 202(1)-202(M) of FIG. 2).

As described above, the dynamic RTF adjustment component 320 may determine a respective correlation factor $\mu_l$ (and thus, a respective combined RTF vector $h_l$) for each frame of the received audio signal 302. For example, if more noise is detected in the $l^{th}$ frame of the audio signal 302 than the $(l-1)^{th}$ frame, the dynamic RTF adjustment component 320 may increase the correlation factor $\mu_l$ (where $\mu_l > \mu_{l-1})^{th}$ so that the fixed RTF vector h* is weighted more heavily than the instantaneous RTF vector $\hat{h}_l$ in the combined RTF vector $h_l$ (according to Equation 6). On the other hand, if less noise is detected in the $l^{th}$ frame of the audio signal 302 than the $(l-1)^{th}$ frame, the dynamic RTF adjustment component 320 may decrease the correlation factor $\mu_l$ (where $\mu_l < \mu_{l-1}$) so that the instantaneous RTF vector $\hat{h}_l$ is weighted more heavily than the fixed RTF vector h* in the combined RTF vector $h_l$. As a result, the semi-adaptive beamformer 300 may dynamically adjust the beamforming filter 308 on a per-frame basis so that the vector of weights w can adapt to real-time changes in the positioning of the user's mouth, the positioning of one or more microphones, or the SNR of the received audio signal 302.

Figure 4:
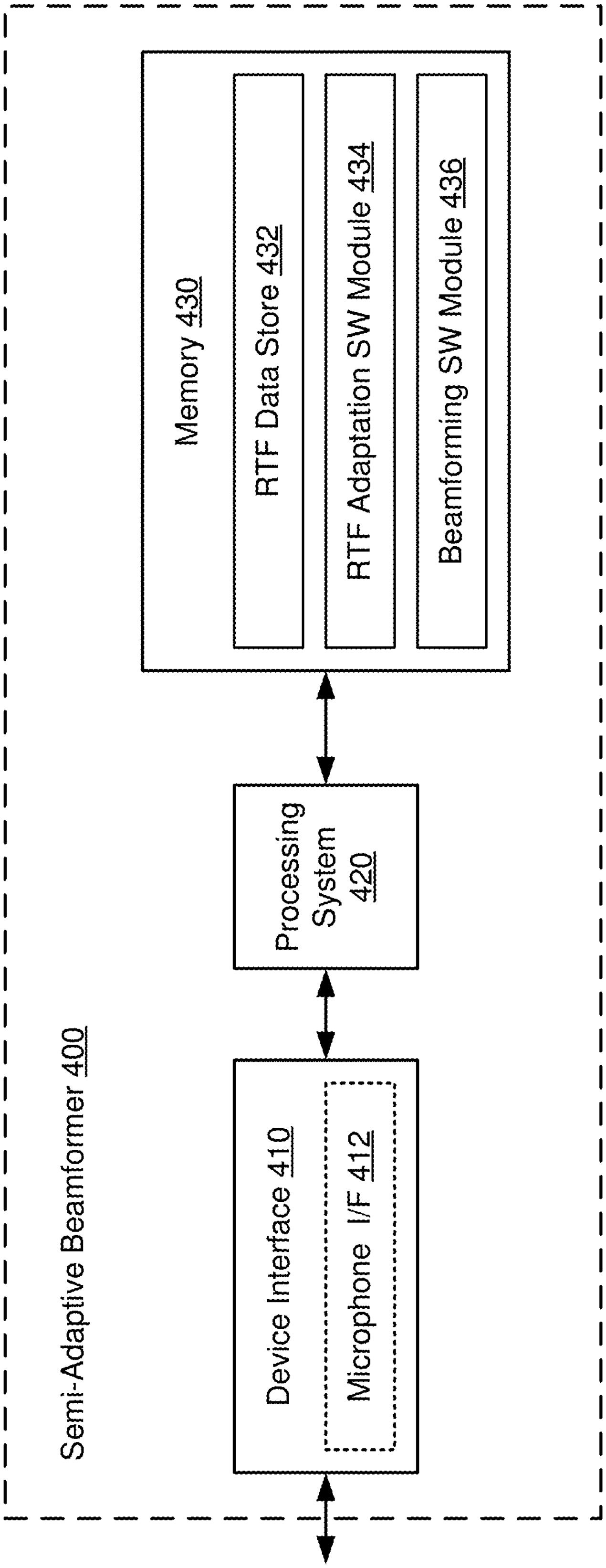
FIG. 4 shows another block diagram of an example semi-adaptive beamformer, according to some implementations.

FIG. 4 shows another block diagram of an example semi-adaptive beamformer 400, according to some implementations. More specifically, the semi-adaptive beamformer 400 may determine a beamforming filter based on an audio signal received via a microphone array. In some implementations, the semi-adaptive beamformer 400 may be one example of the semi-adaptive beamformer 300 of FIG. 3. The semi-adaptive beamformer 400 includes a device interface 410, a processing system 420, and a memory 430.

The device interface 410 is configured to communicate with one or more components of an audio receiver (such as the audio receiver 200 of FIG. 2). In some implementations, the device interface 410 may include a microphone interface (I/F) 412 configured to receive an audio signal via a plurality of microphones in a microphone array and to apply a beamforming filter (including a set of filter coefficients) to the outputs of each of the plurality of microphones. In some implementations, the received audio signal may be temporally subdivided into a plurality of frames each having a respective speech component and a respective noise component.

The memory 430 may include an RTF data store 432 configured to store a fixed RTF vector associated with the microphone array. For example, the fixed RTF vector may include a set of RTFs determined to be a reasonable fit for a variety of users of the microphone array (such as part of a training procedure). The memory 430 also may include a non-transitory computer-readable medium (including one or more nonvolatile memory elements, such as EPROM, EEPROM, Flash memory, or a hard drive, among other examples) that may store at least the following software (SW) modules:

- an RTF adaptation SW module 434 to determine an RTF vector based on a first frame of the plurality of frames, where the RTF vector includes a plurality of RTFs associated with the plurality of microphones, respectively, and a reference microphone of the plurality of microphones; and
- a beamforming SW module 436 to determine an MVDR beamforming filter that reduces a power of the noise component of the first frame, without distorting the speech component of the first frame, based at least in part on the RTF vector, the fixed RTF vector, and a covariance of the noise component of the first frame.

Each software module includes instructions that, when executed by the processing system 420, causes the semi-adaptive beamformer 400 to perform the corresponding functions.

The processing system 420 may include any suitable one or more processors capable of executing scripts or instructions of one or more software programs stored in the semi-adaptive beamformer 400 (such as in the memory 430). For example, the processing system 420 may execute the RTF adaptation SW module 434 to determine an RTF vector based on a first frame of the plurality of frames, where the RTF vector includes a plurality of RTFs associated with the plurality of microphones, respectively, and a reference microphone of the plurality of microphones. Further, the processing system 420 also may execute the beamforming SW module 436 to determine an MVDR beamforming filter that reduces a power of the noise component of the first frame, without distorting the speech component of the first frame, based at least in part on the RTF vector, the fixed RTF vector, and a covariance of the noise component of the first frame.

Figure 5:
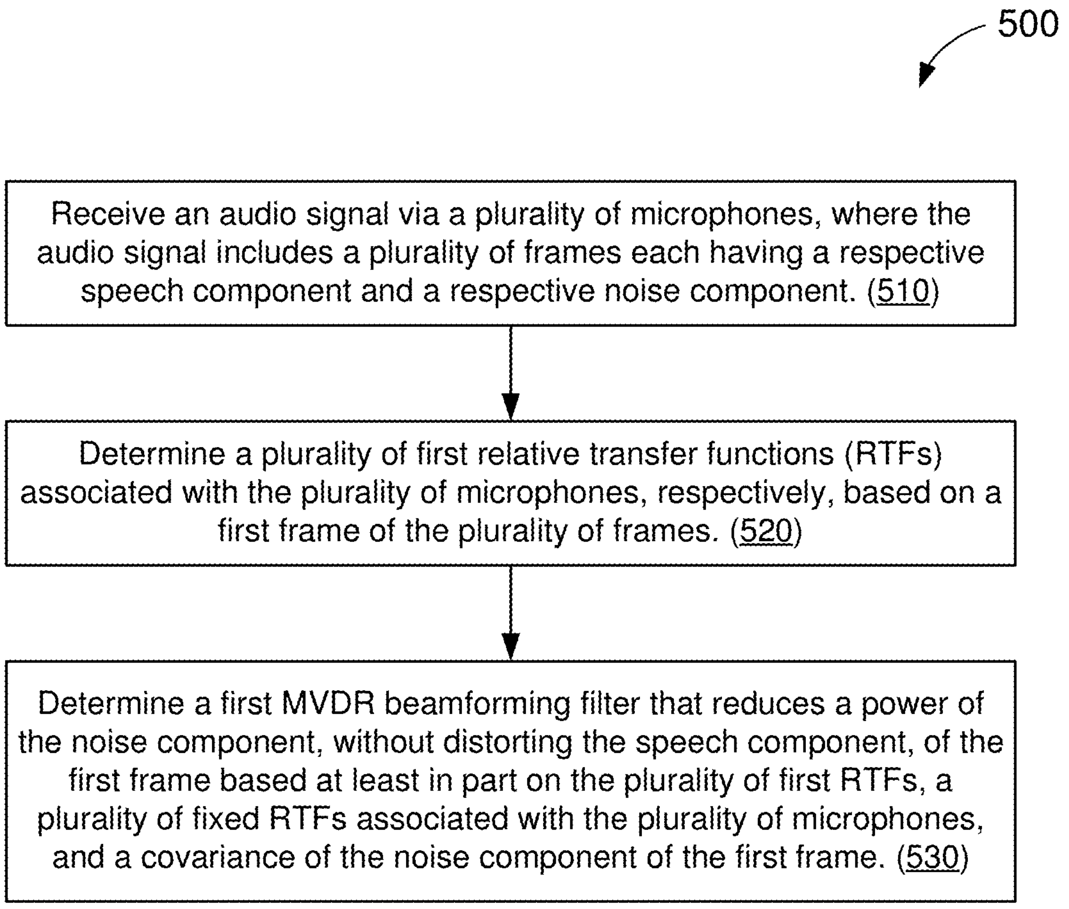
FIG. 5 shows an illustrative flowchart depicting an example operation for processing audio signals, according to some implementations.

FIG. 5 shows an illustrative flowchart depicting an example operation 500 for processing audio signals, according to some implementations. In some implementations, the example operation 500 may be performed by a beamformer such as any of the semi-adaptive beamformers 300 or 400 of FIGS. 3 and 4, respectively.

The beamformer may receive an audio signal via a plurality of microphones, where the audio signal includes a plurality of frames each having a respective speech component and a respective noise component (510). The beamformer may determine a plurality of first relative transfer functions (RTFs) associated with the plurality of microphones, respectively, based on a first frame of the plurality of frames (520). The beamformer may further determine a first MVDR beamforming filter that reduces a power of the noise component, without distorting the speech component, of the first frame based at least in part on the plurality of first RTFs, a plurality of fixed RTFs associated with the plurality of microphones, and a covariance of the noise component of the first frame (530).

In some aspects, the beamformer may further receive, via the plurality of microphones, a training signal having a speech component and a noise component; determine a GEV beamforming filter that increases an SNR associated with a covariance of the speech component of the training signal and a covariance of the noise component of the training signal; and determine the plurality of fixed RTFs based at least in part on the GEV beamforming filter.

In some aspects, the determining of the plurality of first RTFs may include determining a first GEV beamforming filter that increases an SNR associated with a covariance of the speech component of the first frame and the covariance of the noise component of the first frame.

In some aspects, the beamformer may further determine a plurality of first combined RTFs based on the plurality of fixed RTFs, the plurality of first RTFs, and a first correlation factor. In some implementations, the beamformer may determine the first correlation factor based at least in part on a correlation between the plurality of fixed RTFs and the plurality of first RTFs. In some other implementations, the beamformer may determine the first correlation factor based at least in part on the SNR associated with the covariance of the speech component of the first frame.

In some aspects, the beamformer may further determine a plurality of second RTFs associated with the plurality of microphones, respectively, based on a second frame of the plurality of frames; determine a plurality of second combined RTFs based on the plurality of fixed RTFs, the plurality of second RTFs, and a second correlation factor; and determine a second MVDR beamforming filter based on the plurality of second combined RTFs and a covariance of the noise component of the second frame.

In some aspects, the determining of the plurality of second RTFs may include determining a second GEV beamforming filter that increases an SNR associated with a covariance of the speech component of the second frame and the covariance of the noise component of the second frame. In some implementations, the SNR associated with the covariance of the speech component of the second frame may be higher than the SNR associated with the covariance of the speech component of the first frame and the second correlation factor may be less than the first correlation factor. In some other implementations, the SNR associated with the covariance of the speech component of the second frame may be lower than the SNR associated with the covariance of the speech component of the first frame and the second correlation factor may be greater than the first correlation facto.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing audio signals, comprising:

receiving an audio signal via a plurality of microphones, the audio signal including a plurality of frames each having a respective speech component and a respective noise component;

determining a plurality of first relative transfer functions (RTFs) associated with the plurality of microphones, respectively, based on a first frame of the plurality of frames; and determining a first minimum variance distortionless response (MVDR) beamforming filter that reduces a power of the noise component, without distorting the speech component, of the first frame based on the plurality of first RTFs, a plurality of fixed RTFs associated with the plurality of microphones, and a covariance of the noise component of the first frame.

2. The method of claim 1, further comprising:

receiving, via the plurality of microphones, a training signal having a speech component and a noise component;

determining a generalized eigenvalue (GEV) beamforming filter that increases a signal-to-noise ratio (SNR) associated with a covariance of the speech component of the training signal and a covariance of the noise component of the training signal; and determining the plurality of fixed RTFs based at least in part on the GEV beamforming filter.

3. The method of claim 1, wherein the determining of the plurality of first RTFs comprises:

determining a first GEV beamforming filter that increases an SNR associated with a covariance of the speech component of the first frame and the covariance of the noise component of the first frame.

4. The method of claim 3, further comprising:

determining a plurality of first combined RTFs based on the plurality of fixed RTFs, the plurality of first RTFs, and a first correlation factor.

5. The method of claim 4, further comprising:

determining the first correlation factor based at least in part on a correlation between the plurality of fixed RTFs and the plurality of first RTFs.

6. The method of claim 4, further comprising:

determining the first correlation factor based at least in part on the SNR associated with the covariance of the speech component of the first frame.

7. The method of claim 4, further comprising:

determining a plurality of second RTFs associated with the plurality of microphones, respectively, based on a second frame of the plurality of frames;

determining a plurality of second combined RTFs based on the plurality of fixed RTFs, the plurality of second RTFs, and a second correlation factor; and determining a second MVDR beamforming filter based on the plurality of second combined RTFs and a covariance of the noise component of the second frame.

8. The method of claim 7, wherein the determining of the plurality of second RTFs comprises:

determining a second GEV beamforming filter that increases an SNR associated with a covariance of the speech component of the second frame and the covariance of the noise component of the second frame.

9. The method of claim 8, wherein the SNR associated with the covariance of the speech component of the second frame is higher than the SNR associated with the covariance of the speech component of the first frame and the second correlation factor is less than the first correlation factor.

10. The method of claim 8, wherein the SNR associated with the covariance of the speech component of the second frame is lower than the SNR associated with the covariance of the speech component of the first frame and the second correlation factor is greater than the first correlation factor.

11. A beamformer comprising:

a processing system; and a memory storing instructions that, when executed by the processing system, causes the beamformer to:

receive an audio signal via a plurality of microphones, the audio signal including a plurality of frames each having a respective speech component and a respective noise component;

determine a plurality of first relative transfer functions (RTFs) associated with the plurality of microphones, respectively, based on a first frame of the plurality of frames; and determine a first minimum variance distortionless response (MVDR) beamforming filter that reduces a power of the noise component, without distorting the speech component, of the first frame based on the plurality of first RTFs, a plurality of fixed RTFs associated with the plurality of microphones, and a covariance of the noise component of the first frame.

12. The beamformer of claim 11, wherein execution of the instructions further causes the beamformer to:

receive, via the plurality of microphones, a training signal having a speech component and a noise component;

determine a generalized eigenvalue (GEV) beamforming filter that increases a signal-to-noise ratio (SNR) associated with a covariance of the speech component of the training signal and a covariance of the noise component of the training signal; and determine the plurality of fixed RTFs based at least in part on the GEV beamforming filter.

13. The beamformer of claim 11, wherein the determining of the plurality of first RTFs comprises:

determining a first GEV beamforming filter that increases an SNR associated with a covariance of the speech component of the first frame and the covariance of the noise component of the first frame.

14. The beamformer of claim 13, wherein execution of the instructions further causes the beamformer to:

determine a plurality of first combined RTFs based on the plurality of fixed RTFs, the plurality of first RTFs, and a first correlation factor.

15. The beamformer of claim 14, wherein execution of the instructions further causes the beamformer to:

determine the first correlation factor based at least in part on a correlation between the plurality of fixed RTFs and the plurality of first RTFs.

16. The beamformer of claim 14, wherein execution of the instructions further causes the beamformer to:

determine the first correlation factor based at least in part on the SNR associated with the covariance of the speech component of the first frame.

17. The beamformer of claim 14, wherein execution of the instructions further causes the beamformer to:

determine a plurality of second RTFs associated with the plurality of microphones, respectively, based on a second frame of the plurality of frames;

determine a plurality of second combined RTFs based on the plurality of fixed RTFs, the plurality of second RTFs, and a second correlation factor; and determine a second MVDR beamforming filter based on the plurality of second combined RTFs and a covariance of the noise component of the second frame.

18. The beamformer of claim 17, wherein the determining of the plurality of second RTFs comprises:

determining a second GEV beamforming filter that increases an SNR associated with a covariance of the speech component of the second frame and the covariance of the noise component of the second frame.

19. The beamformer of claim 17, wherein the second correlation factor is different than the first correlation factor.

20. A headset comprising:

a plurality of microphones; and a beamformer configured to:

receive an audio signal via a plurality of microphones, the audio signal including a plurality of frames each having a respective speech component and a respective noise component;

determine a relative transfer function (RTF) vector based on a first frame of the plurality of frames, the RTF vector including a plurality of RTFs associated with the plurality of microphones, respectively, and a reference microphone of the plurality of microphones; and determine a minimum variance distortionless response (MVDR) beamforming filter that reduces a power of the noise component of the first frame, without distorting the speech component of the first frame, based on the determined RTF vector, a fixed RTF vector, and a covariance of the noise component of the first frame.

* * * * *